United States Patent
Richardson et al.

(10) Patent No.: US 12,072,022 B2
(45) Date of Patent: Aug. 27, 2024

(54) METHODS AND SYSTEMS FOR A TRANSMISSION

(71) Applicant: Dana Automotive Systems Group, LLC, Maumee, OH (US)

(72) Inventors: James Matthew Richardson, Hinckley (GB); James Allen, Atherstone (GB)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/453,826

(22) Filed: Aug. 22, 2023

(65) Prior Publication Data

US 2024/0068561 A1 Feb. 29, 2024

Related U.S. Application Data

(60) Provisional application No. 63/373,825, filed on Aug. 29, 2022.

(51) Int. Cl.
| | |
|---|---|
| *F16H 61/04* | (2006.01) |
| *F16H 59/40* | (2006.01) |
| *F16H 59/42* | (2006.01) |
| *F16H 59/50* | (2006.01) |
| *F16H 59/60* | (2006.01) |
| *F16H 61/06* | (2006.01) |

(52) U.S. Cl.
CPC ......... *F16H 61/0403* (2013.01); *F16H 59/40* (2013.01); *F16H 59/42* (2013.01); *F16H 59/50* (2013.01); *F16H 59/60* (2013.01); *F16H 61/06* (2013.01)

(58) Field of Classification Search
CPC ................. F16H 61/0403; F16H 2059/465
See application file for complete search history.

(56) References Cited

U.S. PATENT DOCUMENTS

| | | | | |
|---|---|---|---|---|
| 4,706,790 A | * | 11/1987 | Lockhart | F16H 61/143 192/3.3 |
| 5,070,747 A | * | 12/1991 | Lentz | F16H 61/061 477/149 |
| 10,871,203 B2 | * | 12/2020 | Schepperle | F16H 3/093 |
| 2002/0091035 A1 | * | 7/2002 | Monowa | F16H 61/061 477/143 |
| 2005/0177294 A1 | * | 8/2005 | Jiang | F16D 48/066 701/67 |
| 2010/0063693 A1 | * | 3/2010 | Lee | F16H 61/21 477/90 |
| 2010/0160113 A1 | * | 6/2010 | Dreher | F16H 63/502 477/90 |
| 2010/0184561 A1 | * | 7/2010 | Schaarschmidt | F16H 61/688 477/78 |
| 2015/0292616 A1 | * | 10/2015 | Monajemi | F16H 61/061 701/55 |
| 2021/0095761 A1 | * | 4/2021 | Barone | F16H 61/21 |

\* cited by examiner

*Primary Examiner* — Stacey A Fluhart
(74) *Attorney, Agent, or Firm* — McCoy Russell LLP

(57) ABSTRACT

Methods and systems are provided for a powertrain. In one example, a method for a powertrain includes adjusting a coupling between a synchronization shaft and one or more of an input shaft and an output shaft in response to a clutch drag torque. The adjusting is based on speeds of one or more of the input shaft, the synchronization shaft, and the output shaft.

18 Claims, 3 Drawing Sheets

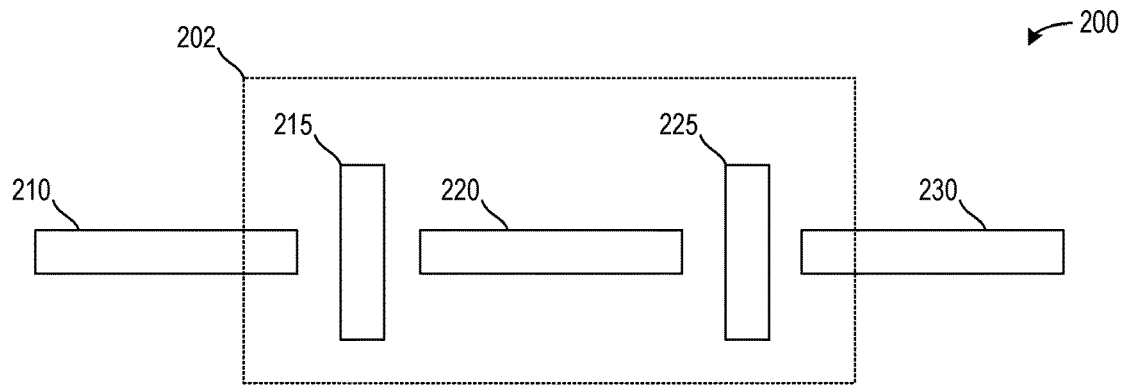
FIG. 2
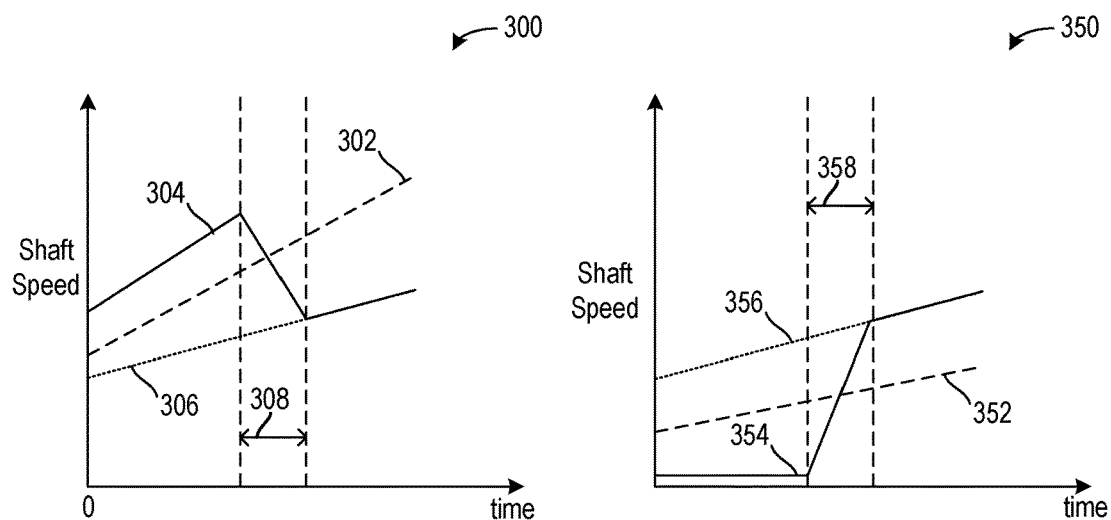
FIG. 3A
FIG. 3B
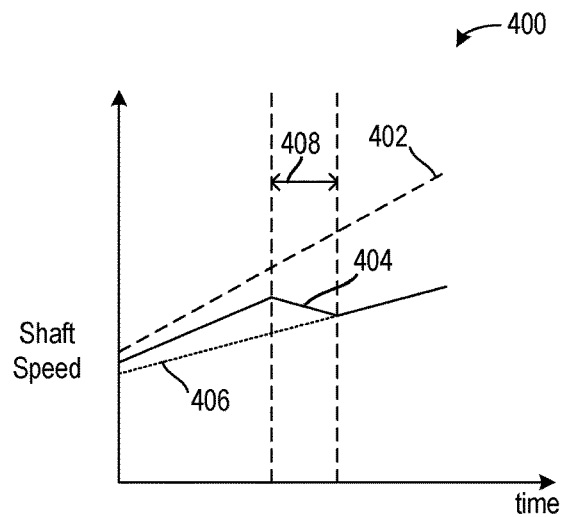
FIG. 4

METHODS AND SYSTEMS FOR A TRANSMISSION

CROSS REFERENCE TO RELATED APPLICATION

The present application claims priority to U.S. Provisional Application No. 63/373,825, entitled "METHODS AND SYSTEMS FOR A TRANSMISSION", and filed on Aug. 29, 2022. The entire contents of the above-listed application are hereby incorporated by reference for all purposes.

TECHNICAL FIELD

The present description relates generally to accounting for clutch drag torque during a gear change of a dual clutch transmission.

BACKGROUND AND SUMMARY

Current vehicle drivetrains may experience prolonged synchronization times during a gear change. Attempts to reduce the synchronization time may include a closed-loop control routine that accounts for clutch drag torque. However, these routines are relatively slow and demands for reduced synchronization times are still desired. Thus, there is a demand for methods and systems that differ from those that already exist.

In one example, the issue described above may be at least partially solved by a method for adjusting a deceleration torque as a function of an actual vehicle speed and an accelerator pedal position when the actual vehicle speed is below a threshold vehicle speed. In this way, the vehicle may decrease in speed as desired while transitioning a regeneration torque (e.g., the deceleration torque) to the traction torque of the going to direction at a vehicle standstill and for an actual accelerator pedal percentage to avoid the torque jump.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 2 is an embodiment of a plurality of shafts with a plurality of disconnect points;

FIGS. 3A and 3B are different examples of adjusting inertia assistance;

FIG. 4 is an example of inertia hindrance; and

DETAILED DESCRIPTION

Figure 1:
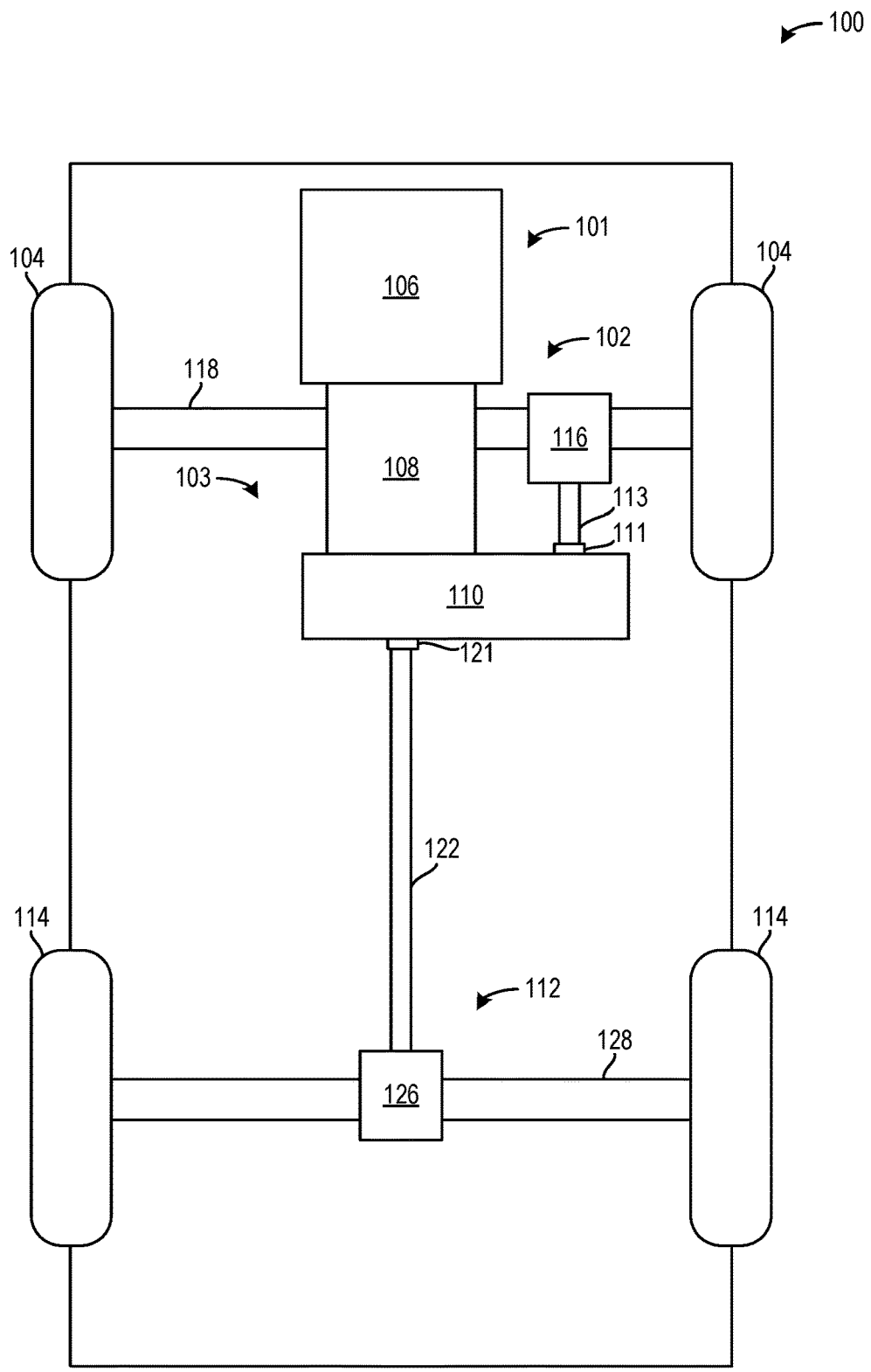
FIG. 1 is a schematic depiction of an example vehicle powertrain.
Figure 5B:
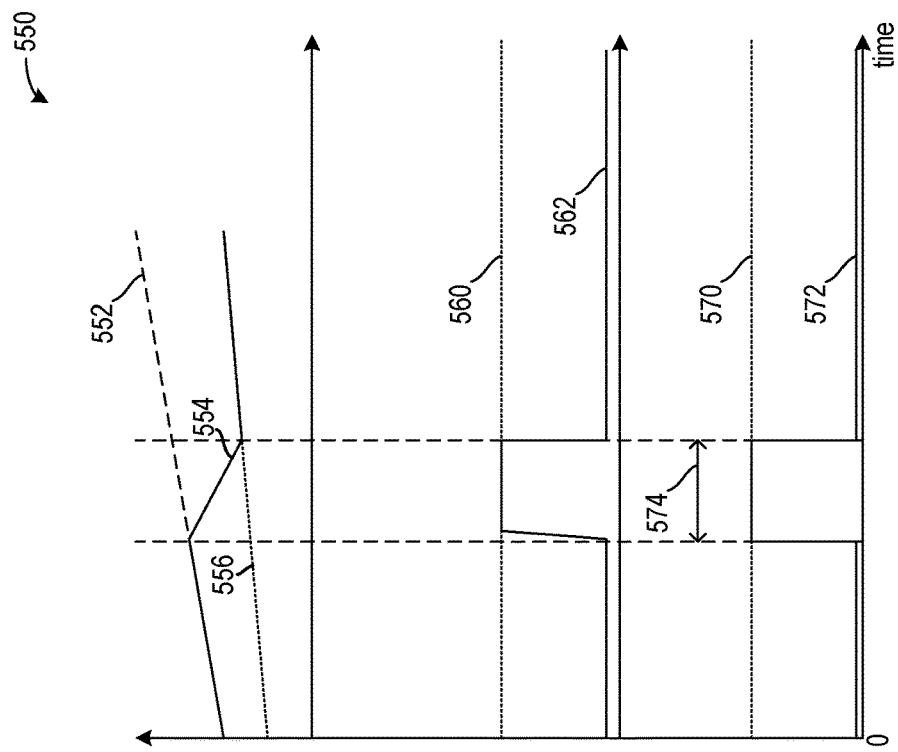
FIGS. 5A and 5B are a comparison of inertia compensation being inactive and active.
Figure 5A:
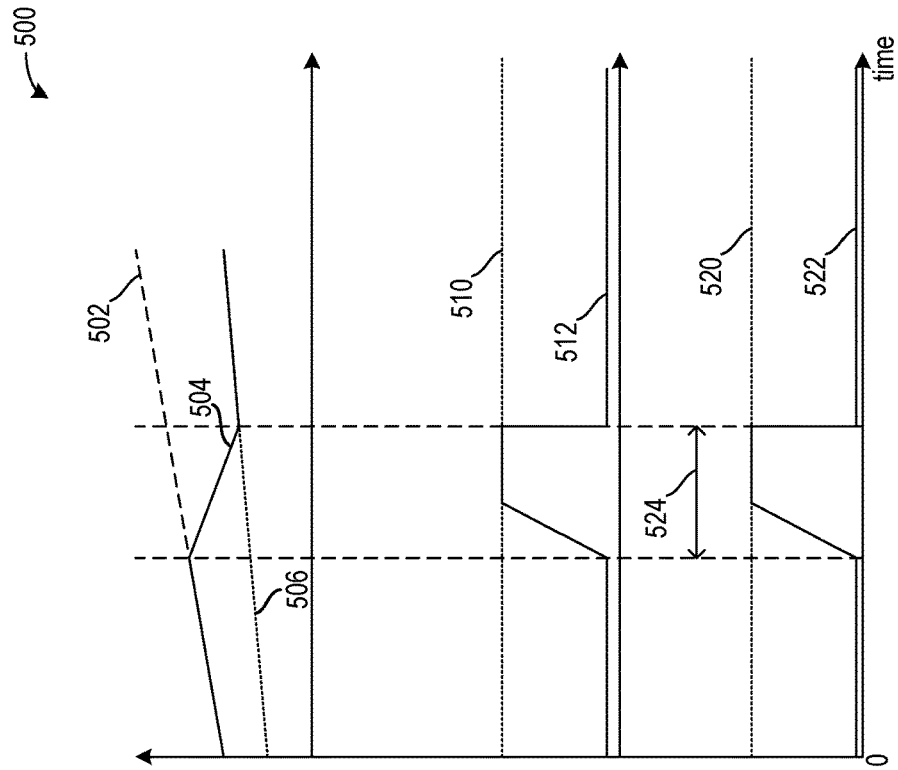

The following description relates to a system for an axle assembly in a vehicle. For example, the vehicle may be propelled by a powertrain, such as illustrated in FIG. 1. The powertrain may include a plurality of shafts with a plurality of disconnect points as shown in FIG. 2. FIGS. 3A and 3B show a reflected inertia at a synchronization point to assist synchronization between input and output sides of the plurality of shafts. FIG. 4 shows an example of an inertia hindrance. FIGS. 5A and 5B show a comparison of inertia assistance via with a feed forward torque compensation and no inertia compensation.

Turning now to FIG. 1, a vehicle 100 is shown comprising a powertrain 101 and a drivetrain 103. The powertrain comprises a prime mover 106 and a transmission 108. The prime mover 106 may be an internal combustion engine or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

The vehicle 100 may be a commercial vehicle, light, medium, or heavy duty vehicle, a passenger vehicle, an off-highway vehicle, and sport utility vehicle. Additionally or alternatively, the vehicle 100 and/or one or more of its components may be in industrial, locomotive, military, agricultural, and aerospace applications.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing. An embodiment of an axle assembly is shown in FIG. 2.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

Turning now to FIG. 2, it shows an embodiment of a plurality of shafts 200. The plurality of shafts 200 may include a first shaft 210, a second shaft 220, and a third shaft 230. Herein, the first shaft 210, the second shaft 220, and the third shaft 230 are referred to herein as an input shaft 210, a synchronizing shaft 220, and an output shaft 230, respectively. The input shaft 210 and the output shaft 230 may be an input shaft and an output shaft of a dual clutch transmission (e.g., transmission 108 of FIG. 1). Dashed box 202 illustrates an example boundary of a transmission casing. Herein, dashed box 202 is referred to as transmission casing 202. In some embodiments, the input shaft 210 and the output shaft 230 may not be the input and output shafts of the transmission and may correspond to any input and output shaft combination of a powertrain.

A first coupling 215 is arranged between the input shaft 210 and the synchronizing shaft 220. A second coupling 225 is arranged between the synchronizing shaft 220 and the outlet shaft 230. The first coupling 215 may couple the input shaft 210 to a first extreme end of the synchronizing shaft 220. The second coupling 225 may couple the output shaft 230 to a second extreme end, opposite the first extreme end, of the synchronizing shaft 220. Each of the first coupling 215 and the second coupling 225 may be mechanical devices comprising an actuator for opening and closing the couplings. For example, by opening the first coupling 215, torque flow from the input shaft 210 to the synchronizing shaft 220 may be disrupted. In one example, the first coupling 215 and the second coupling 225 may be a clutch or a synchronizer. In one example, the first coupling 215 and the second coupling 225 are clutches. In another embodiment, additionally or alternatively, the first coupling 215 and the second coupling 225 are synchronizers. In some embodiments, additionally or alternatively, the first coupling 215 is a clutch and the second coupling 225 is a synchronizer, or vice-versa. In this way, the first coupling 215 and the second coupling 225 may disrupt power flow into and/or out of the transmission.

In one example, the synchronizing shaft 220 may represent a plurality of shafts arranged in a transmission casing, wherein the plurality of shafts comprise one or more gears for reducing and/or multiplying power provided from the input shaft 210. The first coupling 215 and the second coupling 225 may be arranged in a transmission case. The input shaft 210 may extend into the transmission case. In one example, the first coupling 215 may be arranged directly between the input shaft 210 and the synchronizing shaft 220. Additionally or alternatively, the first coupling 215 may include a gear, wherein the gear of the first coupling may transfer power to a gear of the synchronizing shaft 220 when the first coupling 215 is closed and coupled to the input shaft 210. Similarly, the second coupling 225 may include a gear configured to transfer power to a gear of the output shaft 230 when the second coupling 225 is closed. In this way, the first coupling 215 is operable to transfer power to or block power to the transmission and the second coupling 225 is operable to transfer power from or block power to the output shaft 230.

A controller may be configured to control actuators of the first coupling 215 and the second coupling 225 in response to conditions. In one example, the controller may include instructions stored on memory that when executed allow the controller to open or close the couplings to adjust torque flow based on feedback from sensors or data stored in a table. Adjusting torque flow may include adjusting a magnitude of torque flow such that a desired amount of torque flow from a first shaft to a second shaft is achieved. The desired amount of torque flow may be based on a reduced synchronization time.

In one example, a method may include using clutch drag torque data to calculate if a drag toque will assist or resist a synchronization (e.g., a coupling) of a particular shaft. If the clutch drag torque will affect the synchronization to be different than a desired shaft speed synchronization, then the method may include adjusting a position of the coupling. For example, if the drag torque assists the synchronization such that a shaft speed synchronization is faster than the desired shaft speed synchronization, then a corresponding coupling may be opened and block power transfer between the shafts. As another example, if the drag torque resists the synchronization such that a shaft speed synchronization is slower than the desired shaft speed synchronization, then a corresponding coupling may be closed. In one example, controller may adjust a gear actuator line pressure to open or close the corresponding coupling to adjust the magnitude of torque flow.

The method may include a feed-forward compensation of torque, which may be executed more quickly than ramping an I-term of a PID (proportional-integral-derivative) controller. The feed-forward compensation may be based on a calculated drag torque at each synchronizer arranged in the first and second couplings. The drag data may be obtained experimentally and stored in a multi-input look-up table. Inputs may include input shaft speed, output shaft speed, synchronizing shaft speed, system temperature, and input torque. Experimental collection of the drag data may include placing all the synchronizers of the transmission in neutral, opening the clutches, providing any required clutch cooling and driving the input of the transmission. The rate of acceleration is then measured and using the rotational form of Newton's Second Law ($T=I\alpha$) and the known reflected inertia of the spun shafts at the clutch. The drag torque can be calculated based on these values. This process is then repeated for a variety of transmission temperatures and input torques to obtain a full spectrum of clutch drag values for various conditions. The drag torque is then calculated at each synchronizer by multiplying the clutch drag by the gear ratio between the clutch and a gear of an associated synchronizer shaft.

Turning now to FIGS. 3A and 3B, they show examples of drag torque resulting in an inertia assistance, which may reduce a synchronization time or result in noise, vibration, and harshness (NVH) during a gear shift. FIG. 3A shows plot 300 including an input shaft speed 302, a synchronizer shaft speed 304, an output shaft speed 306, and a synchronization phase duration 308. The depicted inertia during the synchronization phase may assist synchronization if the synchronization shaft speed changes (e.g., decreases) in speed in a same direction as to the inertia to synchronize with both the input and output shafts. As such, the first coupling device 215 and the second coupling device 225 of FIG. 2 may be closed.

FIG. 3B shows a plot 350 including an input shaft speed 352, a synchronizer shaft speed 354, an output shaft speed 356, and a synchronization phase duration 358. The depicted inertia during the synchronization phase may assist synchronization as the synchronization shaft speed changes (e.g., increases) in speed in a same direction as to the inertia to synchronize with both the input and output shafts. Thus, based on each of FIGS. 3A and 3B, regardless of the synchronization shaft speed increasing or decreasing, if the synchronization shaft speed synchronizes with the input shaft speed as it changes to match the output shaft speed during an inertia assisting example, NVH may occur during a shift change. This may be undesired for a vehicle operator. As such, the first coupling device 215 and the second coupling device 225 of FIG. 2 may be closed.

Turning now to FIG. 4, it shows a plot 400 illustrating an example of an inertia hindering a shift change. The plot 400 illustrates an input shaft speed 402, a synchronization shaft speed 404, an output shaft speed 406, and a synchronization phase duration 408. The inertia at the synchronization phase may hinder synchronization when the synchronizer shaft speed is between the input and output shaft speeds. In the example, of FIG. 4, the synchronizer shaft speed is less than the input shaft speed and greater than the output shaft speed at the beginning of the synchronization phase. As such, one of the first coupling 415 and the second coupling 225 may be open and the other closed. In the example of FIG. 4, the second coupling 225 is closed and the first coupling 415 is opened. As such, the synchronization shaft speed 404 decreases toward the output shaft speed 406 with the second coupling 225 closed. In some examples, additionally or alternatively, the first coupling 415 is closed and the second coupling 225 is opened such that the synchronization shaft speed increases to match the input shaft speed 402.

Turning now to FIGS. 5A and 5B, they show a comparison of a closed-loop control without inertia compensation and a feed-forward control with inertia compensation, respectively. FIG. 5A illustrates plot 500 including an input shaft speed 502, a synchronizer shaft speed 504, an output shaft speed 506, a desired shaft speed rate of change 510, an actual shaft speed rate of change 512, a desired synchronization pressure 520, a commanded synchronization pressure 522, and a synchronization phase 524. The synchronizer shaft speed 504 decreases from the input shaft speed 502 to the output shaft speed 506 during the synchronization phase 524. The actual shaft speed rate of change 512 gradually increases to the desired shaft speed rate of change 510 during the synchronization phase 524. The commanded synchronization pressure 522 increases and becomes equal to the desired synchronization pressure 520 during the synchronization phase 524. The synchronization phase 524 ends when the synchronizer shaft speed 504 is equal to the output shaft speed 506. During the synchronization phase 524, the synchronizer shaft is decoupled from the input shaft. The synchronizer shaft may be coupled to the output shaft once the speed of the synchronizer shaft matches a speed of the output shaft, once the synchronizer shaft reaches the desired shaft speed rate of change, and/or once the commanded synchronization pressure reaches the desired synchronization pressure.

FIG. 5B illustrates plot 550 including an input shaft speed 552, a synchronizer shaft speed 554, an output shaft speed 556, a desired shaft speed rate of change 560, an actual shaft speed rate of change 562, a desired synchronization pressure 570, a commanded synchronization pressure 572, and a synchronization phase 574. The synchronizer shaft speed 554 decreases from the input shaft speed 552 to the output shaft speed 556 during the synchronization phase 574. The actual shaft speed rate of change 562 rapidly increases to the desired shaft speed rate of change 560 during the synchronization phase 574. In one example, the actual shaft speed rate of change 562 is higher than the actual shaft speed rate of change 512 of FIG. 5A. The commanded synchronization pressure 572 is equal to the desired synchronization pressure 570 during an entirety of the synchronization phase 574. In one example, the commanded synchronization pressure 572 is stepped to the desired synchronization pressure 570. In one example, stepping the pressure includes where the pressure is instantly increased to the desired pressure. Additionally or alternatively, the stepped pressure is increased at a faster rate than the gradual increase shown in FIG. 5A via the closed-loop control. The synchronization phase 574 ends when the synchronizer shaft speed 554 is equal to the output shaft speed 556.

The synchronization phase 574 is shorter than the synchronization phase 524 of FIG. 5A due to the feed-forward compensation of the inertia of the clutch (e.g., clutch drag torque) compared to the closed-loop control of FIG. 5A. As such, the gear shift may be smoother and faster. By doing this, customer satisfaction may be improved and vehicle operation may be enhanced. For example, a longevity of the powertrain components may be improved.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various hardware components in combination with the electronic controller.

The disclosure provides support for a method for a powertrain including adjusting a coupling between a synchronization shaft and one or more of an input shaft and an output shaft in response to a clutch drag torque. A first example of the method further includes where adjusting a synchronization pressure stepwise based on a feed-forward compensation of the clutch drag torque. A second example of the method, optionally including the first example, further includes where the synchronization shaft is arranged between the input shaft and the output shaft. A third example of the method, optionally including one or more of the previous examples, further includes where the coupling comprises a first clutch and a second clutch, the first clutch arranged between the input shaft and the synchronization shaft and the second clutch arranged between the synchronization shaft and the output shaft. A fourth example of the method, optionally including one or more of the previous examples, further includes where the coupling comprises a first synchronizer and a second synchronizer, the first synchronizer arranged between the input shaft and the synchronization shaft and the second synchronizer arranged between the synchronization shaft and the output shaft. A fifth example of the method, optionally including one or more of the previous examples, further includes where associating the clutch drag torque to powertrain conditions comprising an input shaft speed, a synchronization shaft speed, and an output shaft speed. A sixth example of the method, optionally including one or more of the previous examples, further includes where adjusting the coupling is proportional to the clutch drag torque.

The disclosure provides additional support for a system for a powertrain including a first shaft coupled to a first extreme end of a second shaft via a first coupling, a third shaft coupled to a second extreme end opposite the first extreme end of the second shaft via a second coupling, and a controller comprising computer-readable instructions stored on memory thereof that when executed cause the controller to adjust one or more of the first coupling and the second coupling in response to a clutch drag torque during a gear change. A first example of the system further includes where the clutch drag torque is based on a current first shaft speed, a current second shaft speed, and a current third shaft speed. A second example of the system, optionally including the first example, further includes where the clutch drag torque is further based on a gear change direction. A third example of the system, optionally including one or more of the previous examples, further includes where the first shaft is an input shaft of a transmission and the third shaft is an output shaft of the transmission. A fourth example of the system, optionally including one or more of the previous examples, further includes where the instructions further enable the controller to adjust a synchronization pressure to a desired synchronization pressure in a stepwise manner based on the clutch drag torque. A fifth example of the system, optionally including one or more of the previous examples, further includes where the first coupling, the second coupling, and the second shaft are arranged within a transmission casing. A sixth example of the system, optionally including one or more of the previous examples, further includes where the instructions further cause the controller to step a commanded synchronization pressure to a desired synchronization pressure during the gear change. A seventh example of the system, optionally including one or more of the previous examples, further includes where the instructions further cause the controller to operate the gear change with a closed loop control, wherein the closed loop control gradually increases a commanded synchronization pressure to a desired synchronization pressure.

The disclosure provides further support for a method for a transmission including adjusting a position of a first coupling or a second coupling in response to a speed of an input shaft, a speed of a synchronizer shaft, and a speed of an output shaft during a gear change, wherein the first coupling is arranged between the input shaft and the synchronizer shaft and the second coupling is arranged between the synchronizer shaft and the output shaft. A first example of a method further includes stepping a commanded synchronization pressure to a desired synchronization pressure during a synchronization phase of the gear change. A second example of the method, optionally including the first example, further includes where the adjusting comprises adjusting the position of the first coupling and the second coupling to a closed position when the speed of the synchronizer shaft is greater than or less than each of the speed of the input shaft and the speed of the output shaft. A third example of the method, optionally including one or more of the previous examples, further includes where the adjusting comprising adjusting the position of one of the first coupling and the second coupling to a closed position and the other of the first coupling and the second coupling to an open position when the speed of the synchronizer shaft is between the speed of the input shaft and the speed of the output shaft. A fourth example of the method, optionally including one or more of the previous examples, further includes where the adjusting is further based on a feed-forward compensation of clutch drag torque.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a powertrain, comprising:
adjusting one or more of a first coupling between a synchronization shaft and an input shaft and a second coupling between the synchronization shaft and an output shaft in response to a clutch drag torque, wherein the adjusting comprises adjusting a position of the first coupling and a position of the second coupling to a closed position when a speed of the synchronization shaft is greater than or less than each of a speed of the input shaft and a speed of the output shaft.

2. The method of claim 1, further comprising adjusting a synchronization pressure stepwise based on a feed-forward compensation of the clutch drag torque.

3. The method of claim 1, wherein the synchronization shaft is arranged between the input shaft and the output shaft.

4. The method of claim 1, wherein the first coupling comprises a first clutch and the second coupling comprises a second clutch.

5. The method of claim 1, wherein the first coupling comprises a first synchronizer and the second coupling comprises a second synchronizer.

6. The method of claim 1, further comprising associating the clutch drag torque to powertrain conditions comprising an input shaft speed, a synchronization shaft speed, and an output shaft speed.

7. The method of claim 1, wherein adjusting the coupling is based at least in part on the clutch drag torque changing the synchronization to be faster or slower than a desired shaft speed synchronization.

8. A system for a powertrain, comprising:
a first shaft coupled to a first extreme end of a second shaft via a first coupling;
a third shaft coupled to a second extreme end opposite the first extreme end of the second shaft via a second coupling; and
a controller comprising computer-readable instructions stored on memory thereof that when executed cause the controller to:
adjust one or more of the first coupling and the second coupling in response to a clutch drag torque during a gear change, wherein the adjusting comprises adjusting a position of the first coupling and a position of the second coupling to a closed position when a speed of the synchronization shaft is greater than or less than each of a speed of the first shaft and a speed of the second shaft.

9. The system of claim 8, wherein the clutch drag torque is based on a current first shaft speed, a current second shaft speed, and a current third shaft speed.

10. The system of claim 8, wherein the first shaft is an input shaft of a transmission and the third shaft is an output shaft of the transmission.

11. The system of claim 8, wherein the instructions further enable the controller to adjust a synchronization pressure to a desired synchronization pressure in a stepwise manner based on the clutch drag torque.

12. The system of claim 8, wherein the first coupling, the second coupling, and the second shaft are arranged within a transmission casing.

13. The system of claim 8, wherein the instructions further cause the controller to step a commanded synchronization pressure to a desired synchronization pressure during the gear change.

14. The system of claim 8, wherein the instructions further cause the controller to operate the gear change with a closed loop control, wherein the closed loop control gradually increases a commanded synchronization pressure to a desired synchronization pressure.

15. A method for a transmission, comprising:
adjusting a position of a first coupling or a second coupling in response to a speed of an input shaft, a speed of a synchronizer shaft, and a speed of an output shaft during a gear change, wherein the first coupling is arranged between the input shaft and the synchronizer shaft and the second coupling is arranged between the synchronizer shaft and the output shaft, and wherein the adjusting comprises adjusting the position of the first coupling and the position of the second coupling to a closed position when the speed of the synchronizer shaft is greater than or less than each of the speed of the input shaft and the speed of the output shaft.

16. The method of claim 15, further comprising stepping a commanded synchronization pressure to a desired synchronization pressure during a synchronization phase of the gear change.

17. The method of claim 15, wherein the adjusting further comprises adjusting the position of one of the first coupling and the second coupling to a closed position and the other of the first coupling and the second coupling to an open position when the speed of the synchronizer shaft is between the speed of the input shaft and the speed of the output shaft.

18. The method of claim 15, wherein the adjusting is further based on a feed-forward compensation of clutch drag torque.

* * * * *